(No Model.)
J. BLACK & F. C. A. NATIUS.
TEA KETTLE.
No. 473,819. Patented Apr. 26, 1892.
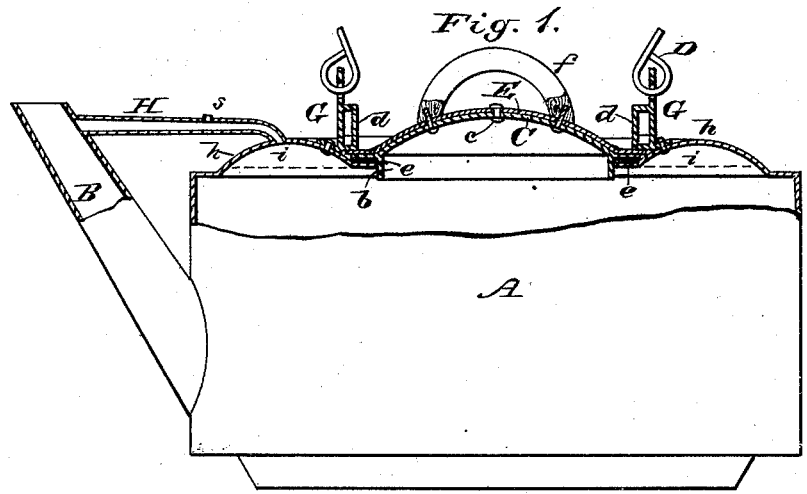
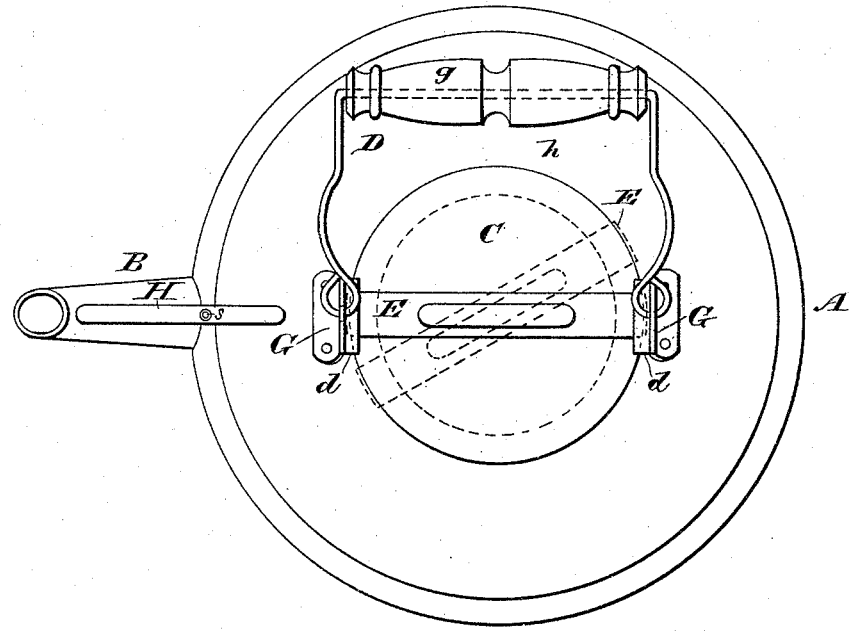
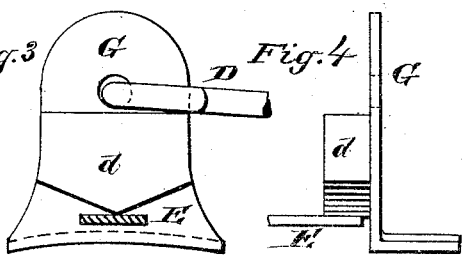
WITNESSES:
J. A. Bergstrom
C. Sedgwick
INVENTORS:
J. Black
F. C. A. Natius
BY Munn & Co.
ATTORNEYS
THE NORRIS PETERS CO., PHOTO-LITHO., WASHINGTON, D. C.

UNITED STATES PATENT OFFICE.

JOHN BLACK AND FRED. C. A. NATIUS, OF SOUTH CHICAGO, ILLINOIS.

TEA-KETTLE.

SPECIFICATION forming part of Letters Patent No. 473,819, dated April 26, 1892.

Application filed November 7, 1891. Serial No. 411,170. (No model.)

*To all whom it may concern:*

Be it known that we, JOHN BLACK and FRED. C. A. NATIUS, of South Chicago, in the county of Cook and State of Illinois, have invented a new and useful Improvement in Tea-Kettles, of which the following is a full, clear, and exact description.

This invention consists in the construction hereinafter described, and more particularly pointed out in the claim.

Reference is to be had to the accompanying drawings, forming a part of this specification, in which similar letters of reference indicate corresponding parts in all the figures.

Figure 1 represents a partly broken and sectional side view of a tea-kettle embodying our invention. Fig. 2 is a plan view of the same; Fig. 3, an inner face view, upon a larger scale, mainly of one of the ears of the kettle which carries the swinging bail or handle, also showing in section a swivel-band attached to the cover for operation in connection with projections on the ears of the kettle to tighten the cover when closing the kettle; and Fig. 4 is a side view of the same.

A indicates the body of the kettle, B its spout, and C its lid or cover, closing the usual filling-opening $b$ in the breast or top of the body.

D is the swinging bail or handle by which the kettle is lifted or carried.

The cover C is designed to make a steam-tight closure of the filling-opening $b$. To this end it is provided with a narrow band E, arranged to pass across the cover and connected therewith by a central rivet or pivot $c$, which admits of the swiveling or turning of the band on the cover. The ends of this band E project far enough to pass under projections $d$ on the inner faces of the ears G G, which carry the swinging bail D. These projections $d$ are of V or wedge shape below, under which the ends of the band E pass when closing the cover, so that by turning the cover or band E from right to left, or vice versa, the cover is made to press closely upon a rubber or other suitable ring or packing $e$, applied to the rim of the cover, thus making the cover C steam-tight when closed.

To hold or manipulate the band E it is provided with a handle $f$, preferably made of wood or other poor conductor of heat to prevent burning of the hands, which handle may be secured to the band by screws, as shown in Fig. 1. When it is required to expose the filling-opening $b$ or to remove the cover, the band E is made to pass from under the projections $d$, as shown by dotted lines in Fig. 2. The bail or handle D of the kettle we prefer to make of wire, provided with a center hand-holding portion $g$ of wood. This bail is connected at its ends in a loose or swinging manner with the ears G G of the kettle above the projections $d$ on said ears, so that when the bail D is thrown over it rests upon the top of said projections, and is prevented from coming in contact with the top or breast $h$ of the kettle, thus avoiding undue heating of the bail and other inconveniences. The ears G G, constructed as described, it will be seen, are thus made to serve a twofold purpose—namely, of holding the bail D from touching the breast or top $h$ of the kettle and by their shoulders or projections $d$ of holding the cover C down.

The breast $h$ of the kettle is constructed to rise up above the general level of the top of the body A, so as to project above the filling-opening $b$, and thus it forms a vacant or air space $i$ when the kettle is filled with cold water up to the top of the filling-opening $b$. Connecting this breast $h$ at its top with the upper part of the spout B is a tube H, for carrying off steam as it is formed in the upper part of the kettle, thus relieving the water in the kettle from pressure and from boiling over, and by the construction, as described, of the breast $h$ of the kettle room is afforded for the water in the kettle, when being heated or boiled, to expand without closing the tube H or causing water to be forced out of the spout. The steam-escape tube H, accordingly, does not connect with the water-space in the body of the kettle, but by a slight bend is connected with the top of the breast $h$ and vacant or steam space $i$, and it is preferably made tapering, increasing in size toward the spout to facilitate escape of the steam, and is preferably provided with a small vent $s$ near where it is bent to join the breast $h$.

By the construction of parts as described the water in the kettle is prevented from boiling over either through the opening closed by the cover or at the spout of the kettle, and in handling the kettle there is no danger of burning or scalding the hands by emitting steam or other discomfort experienced.

Having thus described our invention, what we claim as new, and desire to secure by Letters Patent, is—

A tea-kettle or other vessel provided with transversely-apertured ears G, provided on their inner faces with lugs or projections, the upper edges of which form supports or rests for the bail when swung down and the lower edges being spaced above the top or breast of the vessel, a cover having projections adapted to lock under said lugs or projections, and a bail the ends of which are pivotally connected with the said ears, substantially as set forth.

JOHN BLACK.
FRED. C. A. NATIUS.

Witnesses:
AMBROSE N. SMITH,
FRED. W. S. SOVEREIGN.